US012539513B2

(12) United States Patent
Ohlander et al.

(10) Patent No.: US 12,539,513 B2
(45) Date of Patent: Feb. 3, 2026

(54) MICROFLUIDIC DEVICE

(71) Applicant: CAPITAINER AB, Stockholm (SE)

(72) Inventors: Anna Ohlander, Hägersten (SE); Hans Peter Starck-Johnson, Stockholm (SE); Janosch Hauser, Stockholm (SE); Göran Stemme, Lidingö (SE); Niclas Roxhed, Bromma (SE)

(73) Assignee: CAPITAINER AB, Stockholm (SE)

( * ) Notice: Subject to any disclaimer, the term of this patent is extended or adjusted under 35 U.S.C. 154(b) by 1142 days.

(21) Appl. No.: 17/273,890

(22) PCT Filed: Sep. 5, 2019

(86) PCT No.: PCT/SE2019/050837
§ 371 (c)(1),
(2) Date: Mar. 5, 2021

(87) PCT Pub. No.: WO2020/050770
PCT Pub. Date: Mar. 12, 2020

(65) Prior Publication Data
US 2021/0316300 A1      Oct. 14, 2021

(30) Foreign Application Priority Data

Sep. 6, 2018   (SE) ................................. 1830253-9
Feb. 8, 2019   (SE) ................................. 1950149-3

(51) Int. Cl.
*B01L 3/00*     (2006.01)
*G01N 33/49*    (2006.01)

(52) U.S. Cl.
CPC ..... *B01L 3/50273* (2013.01); *B01L 3/502753* (2013.01); *G01N 33/491* (2013.01);
(Continued)

(58) Field of Classification Search
CPC .......... B01L 3/50273; B01L 3/502753; B01L 2200/0605; B01L 2200/0684;
(Continued)

(56) References Cited

U.S. PATENT DOCUMENTS 5,147,606 A   9/1992  Charlton et al.
5,208,163 A   5/1993  Charlton et al.
(Continued)

FOREIGN PATENT DOCUMENTS

JP   2003-194806 A   7/2003
JP   2008-501938 A   1/2008
(Continued)

OTHER PUBLICATIONS

European Search Report dated May 16, 2022 from corresponding European Application No. 19857238.0.
(Continued)

*Primary Examiner* — Matthew D Krcha
*Assistant Examiner* — Tingchen Shi
(74) *Attorney, Agent, or Firm* — Porter Wright Morris & Arthur LLP

(57) ABSTRACT

Disclosed herein is a microfluidic device and a method for transporting and sampling a defined volume of plasma, providing a fluid passageway from an inlet to an outlet comprising a first region with the inlet with a first high flow resistance configured to receive and collect a whole blood sample and to separate plasma; and a second region with the outlet lower flow resistance. The second region is in fluid connection with the first region and configured to meter the separated plasma by comprising a metering channel.

16 Claims, 8 Drawing Sheets

(52) U.S. Cl.
CPC .............. *B01L 2200/0605* (2013.01); *B01L 2200/0684* (2013.01); *B01L 2300/0681* (2013.01); *B01L 2300/0816* (2013.01); *B01L 2300/126* (2013.01); *B01L 2400/0406* (2013.01)

(58) Field of Classification Search
CPC ..... B01L 2300/0681; B01L 2300/0816; B01L 2300/126; B01L 2400/0406; G01N 33/491
See application file for complete search history.

(56) References Cited

U.S. PATENT DOCUMENTS

| | | |
|---|---|---|
| 2007/0269893 A1 | 11/2007 | Blankenstein et al. |
| 2015/0147777 A1 | 5/2015 | Dothie |
| 2015/0185233 A1 | 7/2015 | Raiker et al. |
| 2017/0003270 A1* | 1/2017 | Béguin ............... B01L 3/50273 |
| 2017/0065973 A1 | 3/2017 | Cummins et al. |
| 2018/0178212 A1 | 6/2018 | Roxhed et al. |
| 2019/0054465 A1* | 2/2019 | Hong ................ B01L 3/502707 |

FOREIGN PATENT DOCUMENTS

| | | | |
|---|---|---|---|
| JP | 2008-76306 A | 4/2008 | |
| JP | 2018-524612 A | 8/2018 | |
| WO | 2015/044454 A2 | 4/2015 | |
| WO | 2015/191406 A1 | 12/2015 | |
| WO | WO-2016209147 A1 * | 12/2016 | .......... B01L 3/50273 |
| WO | 2017/015243 A1 | 1/2017 | |

OTHER PUBLICATIONS

First Examination Report dated Nov. 21, 2022 from corresponding Indian Application No. 202117014342.
English Translation of Office Action dated Jul. 11, 2023 from corresponding Japanese Application No. 2021-512540.
Lenk, Gabriel et al., Capillary driven and volume-metred blood-plasma separation, Part of Proceedings of the 18th International Conference of Solid-State Sensors, Actuators and Microsystems, Transducers, pp. 335-338 (2015).
Search Report from corresponding Swedish Application No. 1950149-3 dated Feb. 8, 2019.

* cited by examiner

MICROFLUIDIC DEVICE

TECHNICAL FIELD

The present invention is directed to a microfluidic plasma extraction and metering thereof from whole blood.

BACKGROUND OF THE INVENTION

Separation of plasma from whole blood is a key step within whole-blood testing for clinical diagnostics and biomedical research purposes. Blood sampling is conventionally done through venipuncture and collection of 5-10 ml whole blood in a tube. For analysis, plasma is usually the preferred substance and is obtained through centrifugation in the centralized laboratory prior to analysis. An alternative collection method to handling liquid samples in tubes, is to apply the blood on a paper material and allow the sample to dry in on the paper. In the laboratory, the dried blood can be re-dissolved and prepared for analysis through wet chemistry. This method is called Dried Blood Spot analysis (DBS) and when combined with a separation technology for retaining blood cells, one can also obtain Dried Plasma Spots (DPS). This methodology has gained popularity as it brings the advantage of no requirement for maintaining a cold chain during transportation to the lab. The simplicity of the storage format also opens up for capillary home sampling by finger prick.

Microfluidic systems and Lab-on-Chips are solutions for reducing time and cost of biochemical assays. Through miniaturization, the volumes to be analyzed are reduced which shortens reaction times and reduces the consumption of expensive reagents amongst other. Microfluidic technology have been applied for plasma extraction purposes. Separation of blood cells from plasma on the microscale can be achieved by either active (externally applied force such as electrical- or magnetic field) or passive (sedimentation, filtration or hydrodynamic effects induced by microfeatures. Further paper based, and centrifugal microfluidics also can be applied.

Many biochemical analyses require quantitation of analytes. To determine the precise concentration of an analyte in a sample, knowledge of the precise sample volume is required. On a microfluidic level, metering of liquids can again be achieved actively or passively. Examples of active means of dividing a volume of fluid into two or more volumes are by introducing components such as active valves that mechanically interfere with the liquid volume to split it up in units or passive valves in combination with pressurized air that can tear of parts of a liquid. In droplet microfluidics, shear forces that appears between two immiscible liquid phases (oil and water) in certain microfluidic geometries (T-junctions) are exploited for liquid compartmentalization. Passive metering has been less reported in the literature. WO2016/209147 demonstrates passive metering using two dissolvable membranes integrated in a microchannel. Further, US2015/0147777 A1 uses intersecting over spill channel structures containing absorbing materials for metering. WO2015/044454 discloses a microfluidic device for collecting and transporting biofluids, preferably whole blood that includes a metering channel for collecting of a metered sample. This device has a first region with a low flow resistance, comprising inlet features, and a second region comprising the metering channel with a high flow resistance, which is an arrangement that may cause problems related to obtain a stable performance adapted to different flows resulting from variations in blood characteristics.

It is desirable to enable completely autonomous systems for plasma sampling brings with advantage of minimal requirement of interaction from the user to run the process, thereby allowing a reduced training level of the user and reduced risk of errors during sampling. An autonomous system by passive means on a microfluidic level would further reduce the complexity and cost of the system, as no external driving forces requiring power sources etc. are required to run the microfluidic functions. To develop such a system would, however, involves the design challenge to comply with a tolerance to a wide range of whole blood characteristics in terms of varying hematocrit, lipid content and coagulation factors which vary largely between individuals, because these variances generate differences in flow characteristics in the system which would be easier to manipulate by allowing active flow manipulation. The present invention is directed to improvements that solves the mentioned problems, while resulting in a volume defined plasma sample.

DESCRIPTION OF THE INVENTION

It is an object of the invention to provide a microfluidic device transporting and metering a sample derived from whole blood with improvements in independency from variations in blood characteristics.

It is an object of the invention to provide a microfluidic device transporting and metering a sample derived from whole blood that is free from time dependent components and that is autonomous and self-supporting.

In one general aspect, the invention relates to a microfluidic device for transporting and sampling a defined volume of plasma, providing a fluid passageway from an inlet to an outlet. The device comprises a first region with the inlet, said first region having a first flow resistance and said first region being configured to receive and collect a whole blood sample and to separate plasma. The device further comprises a second region with the outlet, said second region having a second flow resistance and said second region is in fluid connection with the first region, and is configured to meter the separated plasma. The device further comprises a means for separating the first and the second region; and a capillary means in fluid communication with the outlet and configured to exert sufficiently strong capillary force to transport and absorb the metered plasma volume in the second region, while separating the plasma in the second region from the plasma in the first region. The second region is arranged with at least one air vent and the device according to this aspect admits an effective first flow resistance in the first region that is at least double the value of an effective second flow resistance in the second region, at any given time when transporting plasma.

In this aspect, the term "effective flow resistance" relates to the fact the flow resistance throughout the process of microfluidic transport through the device is dynamic and gradually changes as liquid is replaced by air in the fluid flow.

In this general aspect of the invention, the first region of the device can comprise a plasma extraction compartment comprising the inlet. The plasma extraction compartment is configured to receive and collect a whole blood sample and to separate plasma from the sample for further transport in the device. The second region comprises a metering channel in fluid connection with the outlet and the plasma extraction compartment by means of the fluid connector, preferably the metering channel has a volume of between 0.5 µl and 50 µl. More preferably, the volume of the metering channel is between 1-30 µl.

The defined volume of the metering channel generally determines the context of a microfluidic device and the term "microfluidic" according to the present invention.

In this general aspect of the invention, the plasma extraction compartment comprises at least one of a whole blood reservoir, a plasma separation membrane, and a plasma filtrate chamber for collecting and further transporting the separated plasma. Preferably, but not necessarily, the device is provided with each of a whole blood reservoir, a plasma separation membrane, and a plasma filtrate chamber for collecting and further transporting the separated plasma.

In one embodiment of the microfluidic device the means for separating the first and second region is a connecting channel between the plasma extraction chamber and the metering channel. In this embodiment the connecting channel preferably has a linear extension from the plasma extraction compartment, for example from a plasma filtration chamber to the metering channel. Preferably, the connecting channel and the metering channel have different dimensions. Such dimensions include, but are not limited to cross-sectional area and length, preferably, the connection channel has a lower cross-sectional area than the metering channel.

In one embodiment, the connecting channel is linked to the metering channel with an abrupt change in dimension.

In one embodiment, the connection channel meets the metering channel in a sharp corner so longitudinal symmetry axes of said connection and metering channels cross at an angle that is 90°, or less.

In one embodiment, the device comprises a metering channel with at least one branch with a dead end.

In one embodiment, the device has a connection channel that meets the metering channel so that it divides the metering channel in two asymmetric parts, a first part connected the outlet with longer filling time than a second part. Such a system may be configured as generally T-shaped.

In one embodiment of the device, a first part of the metering channel is a longer part (L1) connected to the outlet and a second part of the metering channel is a short part. (L2) connected to a dead end, for example, the relation of L1:L2 is 5:4 or 4:3, or from 5:4 to 4:3, or in another example, the longer part (L1) has at least the double length compared to the length of the shorter part (L2).

In another embodiment of the microfluidic device according to the invention, the means for separating the first and the second region is a fluid connector extending between an outlet orifice of the plasma extraction compartment and an inlet of the metering channel, the fluid connector is provided with an air vent (FIG. 8). Preferably, the metering channel has a linear extension from an entrance of the metering channel to the outlet of the metering channel. Accordingly, the metering channel is not provided with branches.

In another embodiment of the microfluidic device according to the invention, the means for separating the first and the second region is an air vent located between the plasma filtrate chamber and the metering channel, thereby acting as an interface between the first and the second region of different flow resistance.

In one embodiment, the capillary means of the device is a porous matrix, such as paper, optionally covered by a dissolvable film, such as a film comprising PVA.

In one embodiment, the capillary means of the device is a capillary channel, such as a hydrophilic microfluidic channel being able to empty plasma from the metering channel.

In the device as defined in any earlier embodiment, the blood reservoir can be arranged to limit blood influx to the plasma separation membrane. The blood reservoir suitably is configured to be adapted to the volume of the metering channel and is configured so that the metering channel only can be filled once. Preferably, the volume of the blood reservoir is between 1-200 µl, more preferably 5-200 µl, and still more preferably 10-100 µl.

The device as defined in any earlier embodiment, may comprise a bridging element extending between the outlet and the capillary means. A bridging element serve as a means to support fluid communication between the outlet and the capillary means.

The device as defined in any earlier embodiment, may comprise one or several air vents arranged at suitable a position selected from at least one of: the whole blood reservoir, the metering channel, the outlet region. Preferably, a vent is arranged in the whole blood reservoir connected to the plasma separation membrane, a vent is arranged in a branch of the metering channel and a vent is arranged in connection with the outlet.

In another general aspect of the invention, it pertains to methods of obtaining a metered volume of plasma from a sample of whole blood with undefined volume. The method comprises the steps of: (a) receiving a whole blood sample at the inlet of a structure providing a plasma microfluidic passageway; (b) separating plasma from whole blood and transporting at a first flow resistance plasma from a plasma extraction chamber to a metering channel in said fluid passageway; (c) admitting the plasma to fill the metering channel at a second flow resistance, lower than the first flow resistance, and through an outlet establishing liquid contact with a capillary means; (d) emptying the metering channel by the capillary force of the capillary means, while shearing off plasma remaining in the fluid passageway; and (e) obtaining a plasma sample with a metered volume in the capillary means.

In the so described method or methods, it described how a microfluidic device with a microfluidic passageway is capable of partitioning or shearing off a metered volume plasma so a volume defined sample is provided in the capillary means and any remaining plasma is kept in the system, preferably, in the plasma extraction chamber and essentially in a region with higher flow resistance of the passageway.

In different embodiments of the method or methods it may comprise filling at least one short branch of the metering channel with a dead end and subsequently filling a longer branch of the metering channel with the outlet and thereby establish liquid contact with the capillary means.

The different methods as outlined here are suitably can be performed with any of the earlier embodied devices.

The follow detailed and exemplifying part describe particular embodiments of the invention that aim at be illustrative and should not be regarded as limiting for the scope of the invention as outlined in the claims.

DETAILED AND EXEMPLIFYING
DESCRIPTION OF THE INVENTION

The invention is now described, by way of example, with reference to the accompanying drawings, in which.

Figure 1:
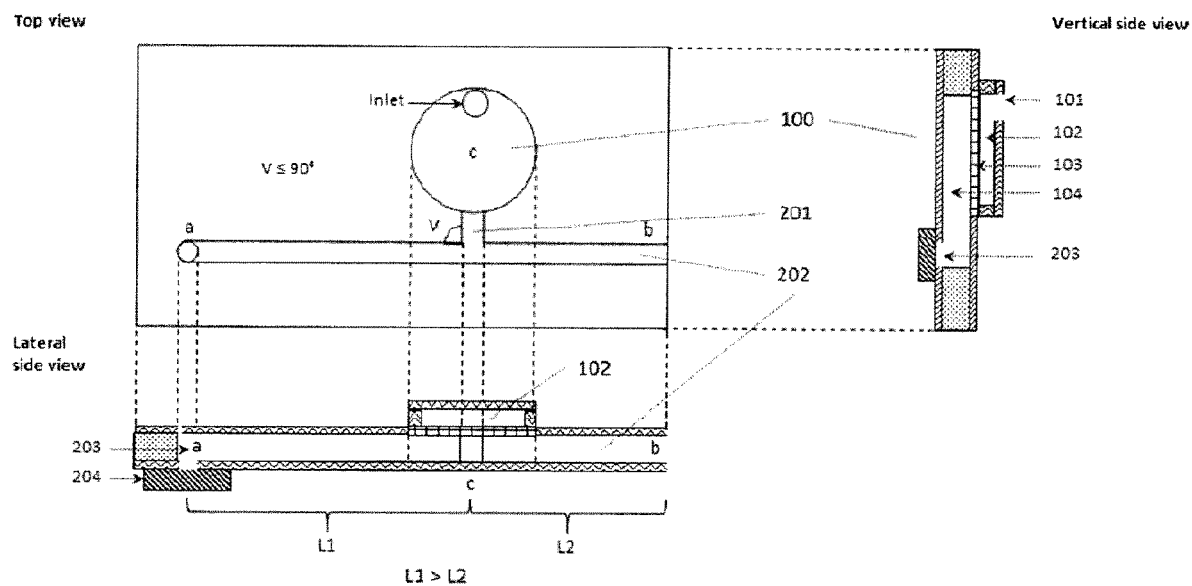
FIG. 1 shows a microfluidic device according to the invention in a top view, a lateral side view and a vertical side view.

FIG. 1 shows an overall sketch of an embodiment of the invented device with a plasma extraction compartment 100) and a metering channel (202) the plasma extraction compartment is connected to the metering channel (202) by a short connecting channel (201) which attaches to the metering channel at a 90° angle or lower represented as V in FIG. 1. The angle V can be configured so as to admit a sharp corner between the connecting channel (201) and the metering channel (202). The point for attachment of the connection channel onto the metering channel is off-centered from the middle of the length of the metering channel so that the length L1 and L2 are formed where L1>L2. The volume of the metering channel is defined by its length, width and height. The metering channel is open to the environment at the end of L2 (b) and connected to a capillary means paper at the end of L1 (a) forming the outlet of the system. The plasma separation in the proposed device is conducted by means of filtration in which a separation membrane (103) is placed in between a whole blood reservoir (102) and a plasma filtrate chamber (104). The whole blood is applied at the inlet (101) of the whole blood reservoir (102). For passive plasma separation to be initiated it is well known that the separation membrane (103) needs to make capillary contact with the bottom substrate (not shown in FIG. 1). This can be achieved by means of introducing microstructures that contact the membrane as in for example Thorslund et al (10.1007/s10544-006-6385-7) or by bending the membrane in a concave shape as proposed in WO2009106331A2 or by introducing a wedge between membrane and channel bottom as suggested in WO2016/209147A1. Once plasma extraction is initiated, the plasma filtrate chamber (104) starts to fill. Once full, the plasma enters the metering channel (202) via the connecting channel (201). The metering channel (202) starts to fill in both directions towards point a and b. Once the plasma has reached the end of L2 (b), plasma only flows in the direction towards the outlet (a). When the plasma reaches the outlet (203), contact is initiated with a capillary means, here embodied by the paper (204). The strong capillary force of the paper pulls the liquid filled in the metering channel into the paper (204) due to its strong wicking force and shears it off from the rest of the plasma in the plasma extraction compartment (104) and connecting channel (201). After emptying of the metered plasma into the paper, plasma extraction continues and the metering channel starts to fill a second time. To avoid plasma to reach the outlet a second time there is a whole blood reservoir in front of the membrane allowing only blood enough for one metered volume. The essential steps of the process can be seen in FIGS. 2-7. The proposed method has been demonstrated for sampling of 13 µl of plasma from 65 µL of whole blood of HCT 30, 40 and 50.

Figure 2:
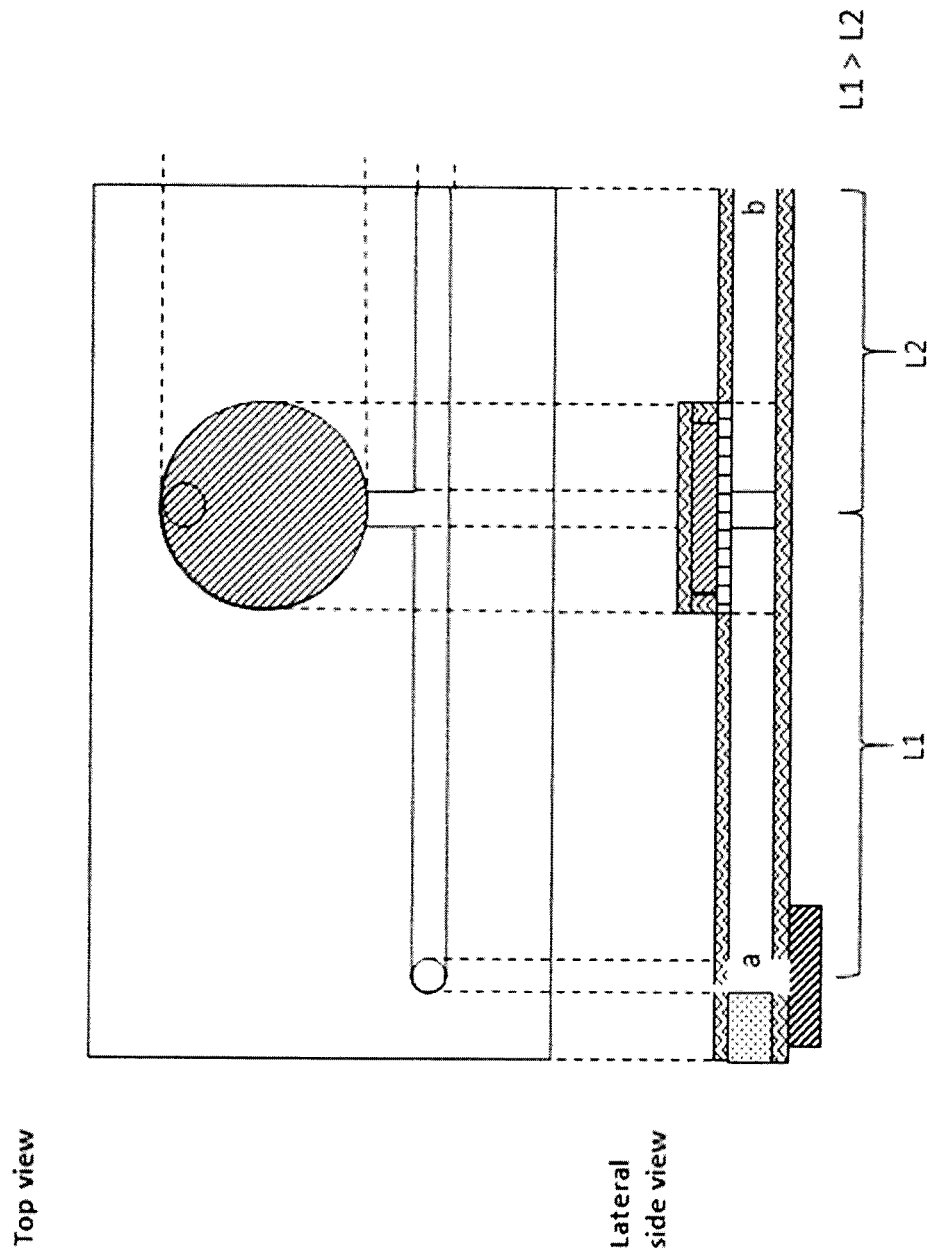
FIG. 2 shows application of whole blood at inlet of whole blood reservoir.

FIG. 2 shows application of whole blood at the inlet arranged with the whole blood reservoir.

Figure 3:
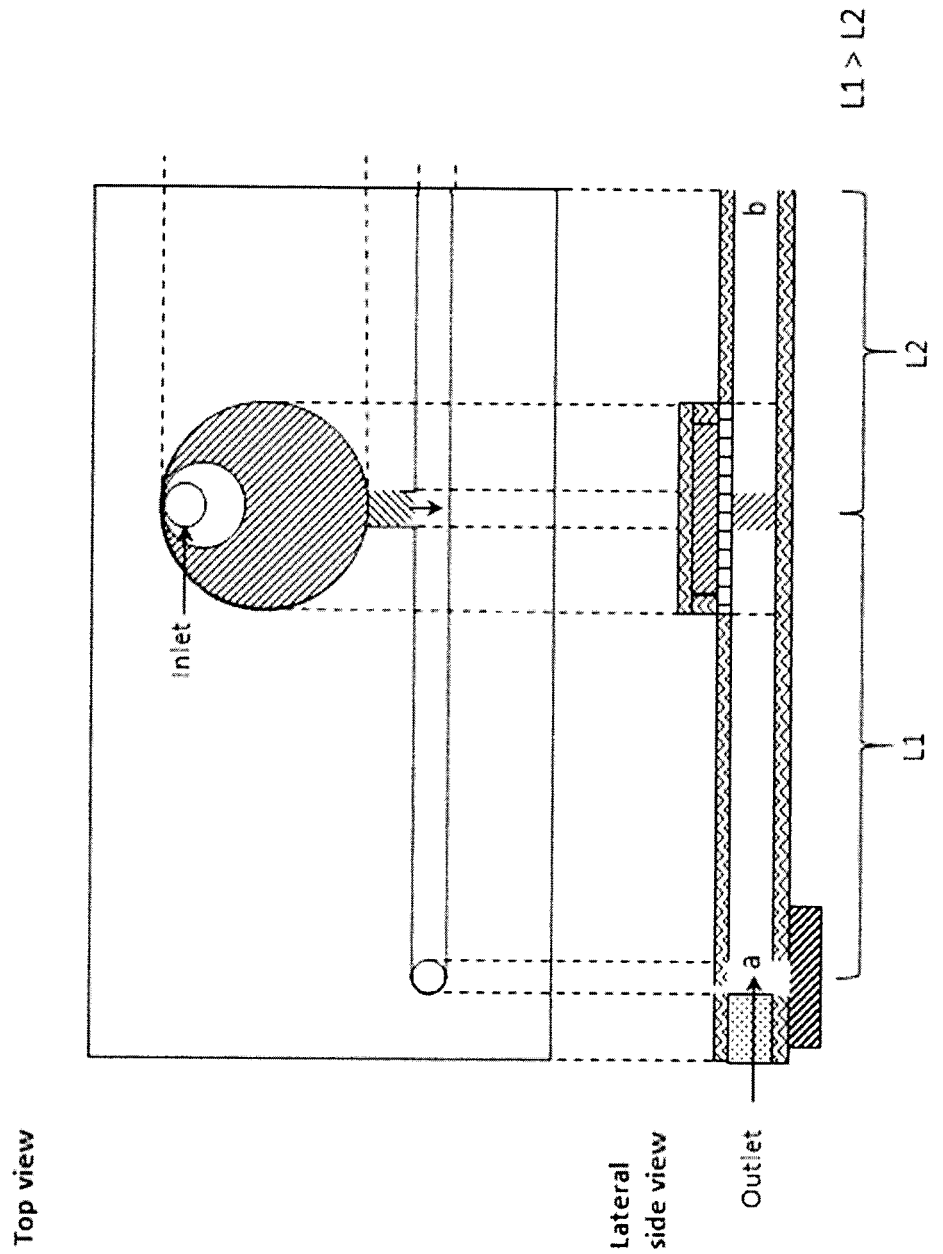
FIG. 3 shows extraction of plasma in a plasma extraction compartment and entrance into connecting channel.

FIG. 3 shows extraction of plasma from plasma extraction compartment entrance into the connecting channel.

Figure 4:
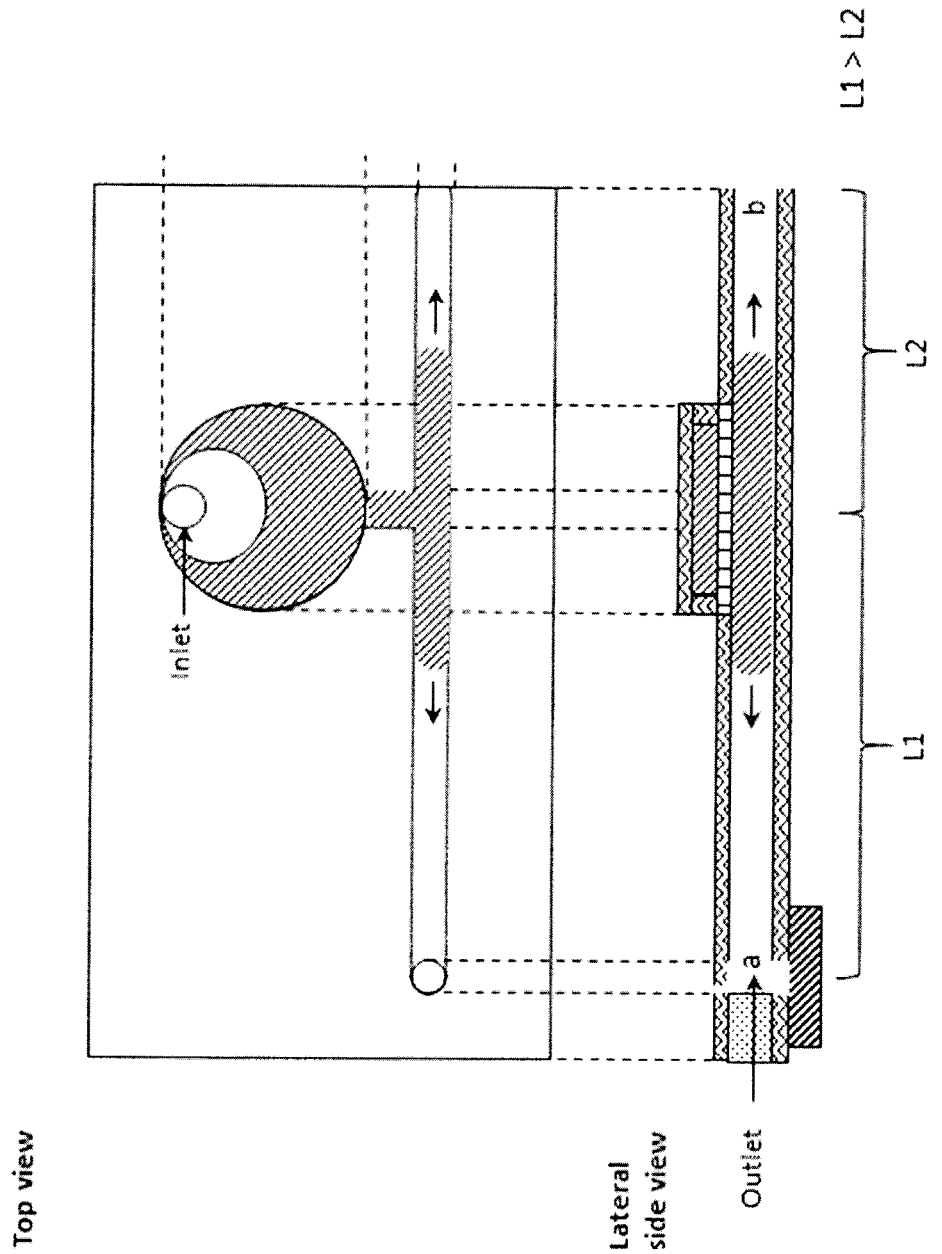
FIG. 4 shows bidirectional filling of the metering channel; towards outlet of metering channel (a) and end of metering channel (b).

FIG. 4 shows bidirectional filling of the metering channel 202; towards the outlet of metering channel (a) and end of metering channel (b).

Figure 5:
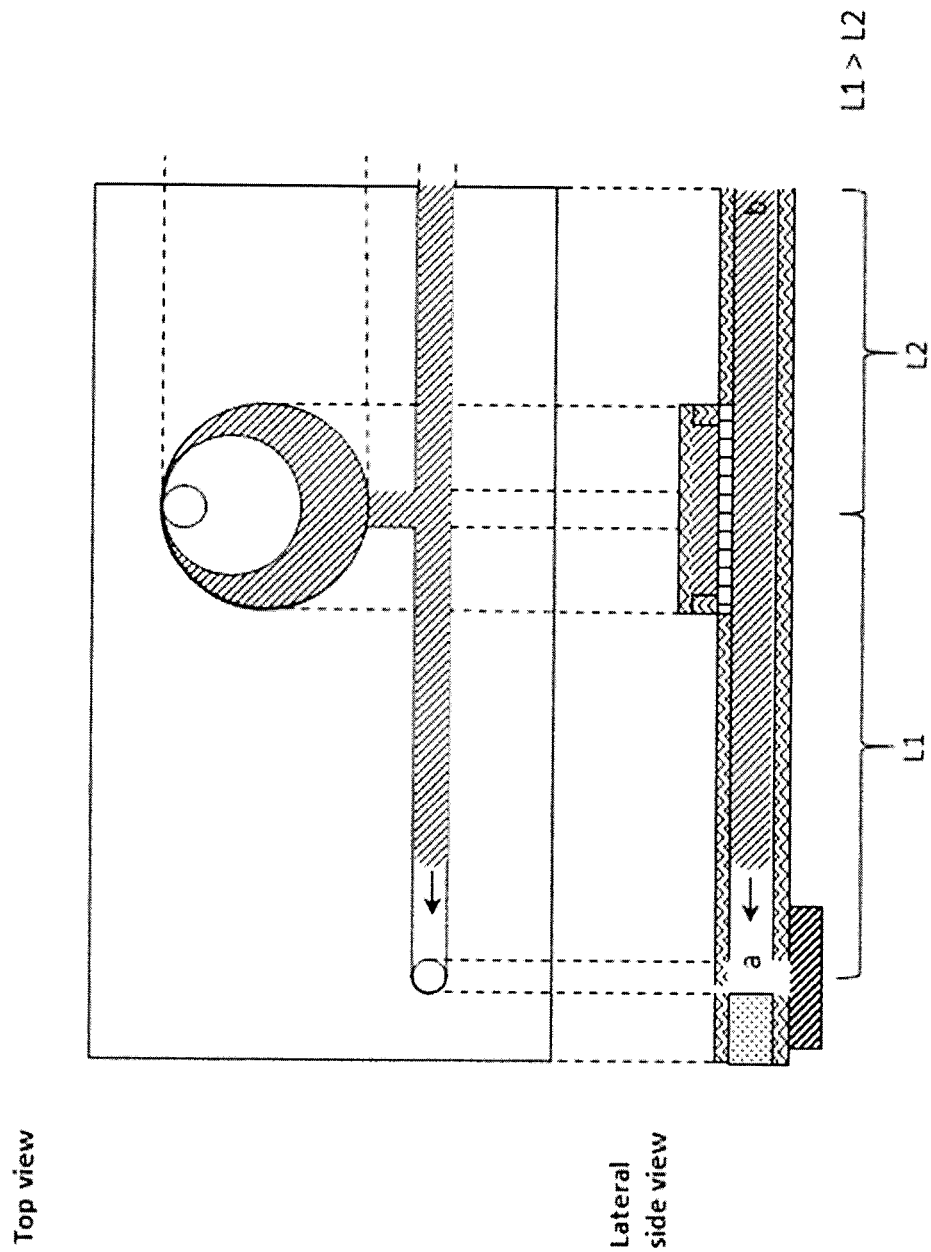
FIG. 5 shows unilateral filling only towards a when the fluid has arrived at b, to FIG. 6 shows how contact with the capillary means at the outlet initiates emptying of the metering channel

FIG. 5 shows how the flow when reaching (b) is changed from bidirectional to unidirectional, thereby filling only towards (a).

Figure 6:
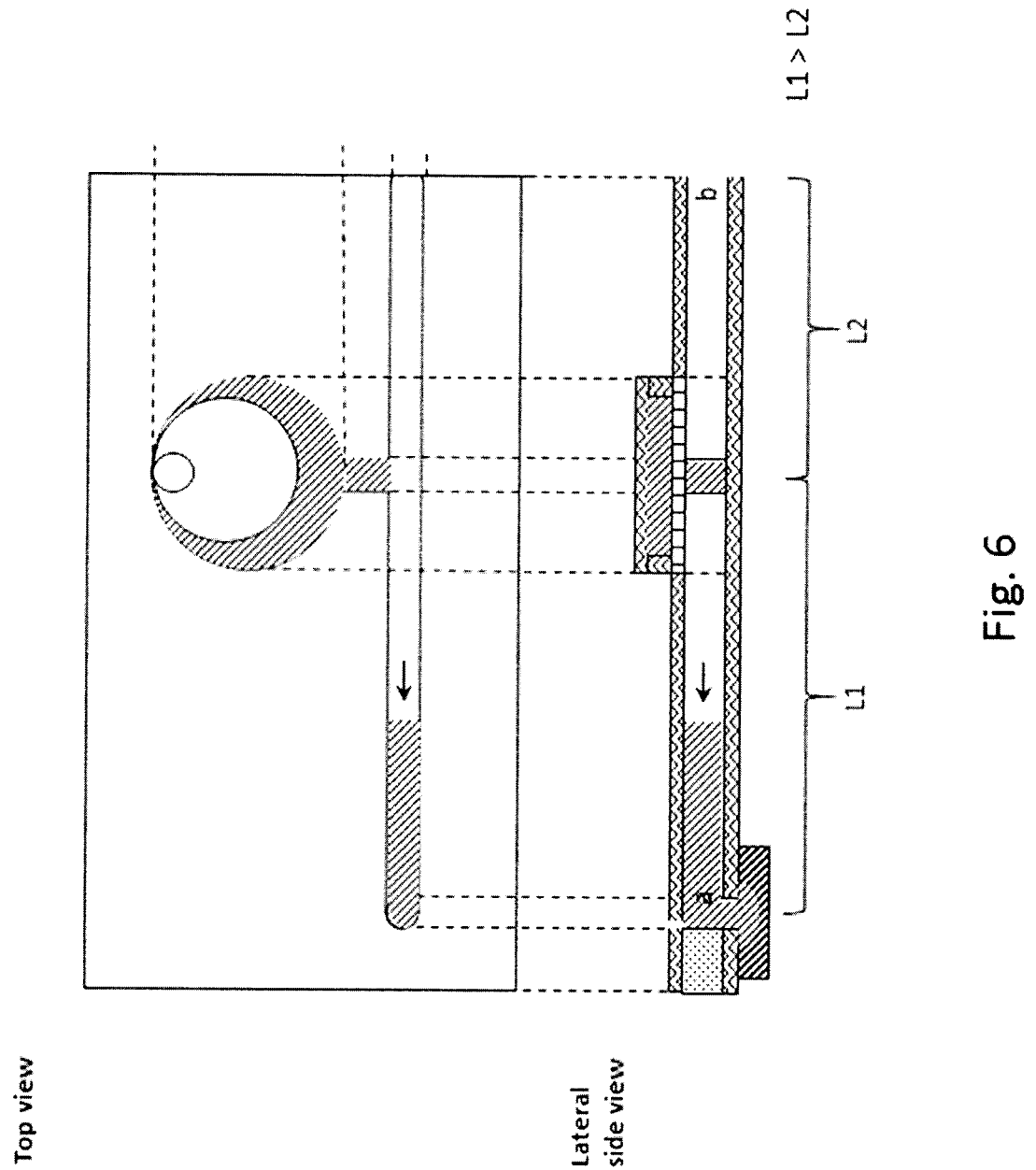

FIG. 6 shows how contact with the capillary means, here the paper, at the outlet initiates emptying of the metering channel due to the strong capillary force of the paper and the liquid in the metering channel is sheared of from the plasma in the extraction compartment and connecting channel.

Figure 7:
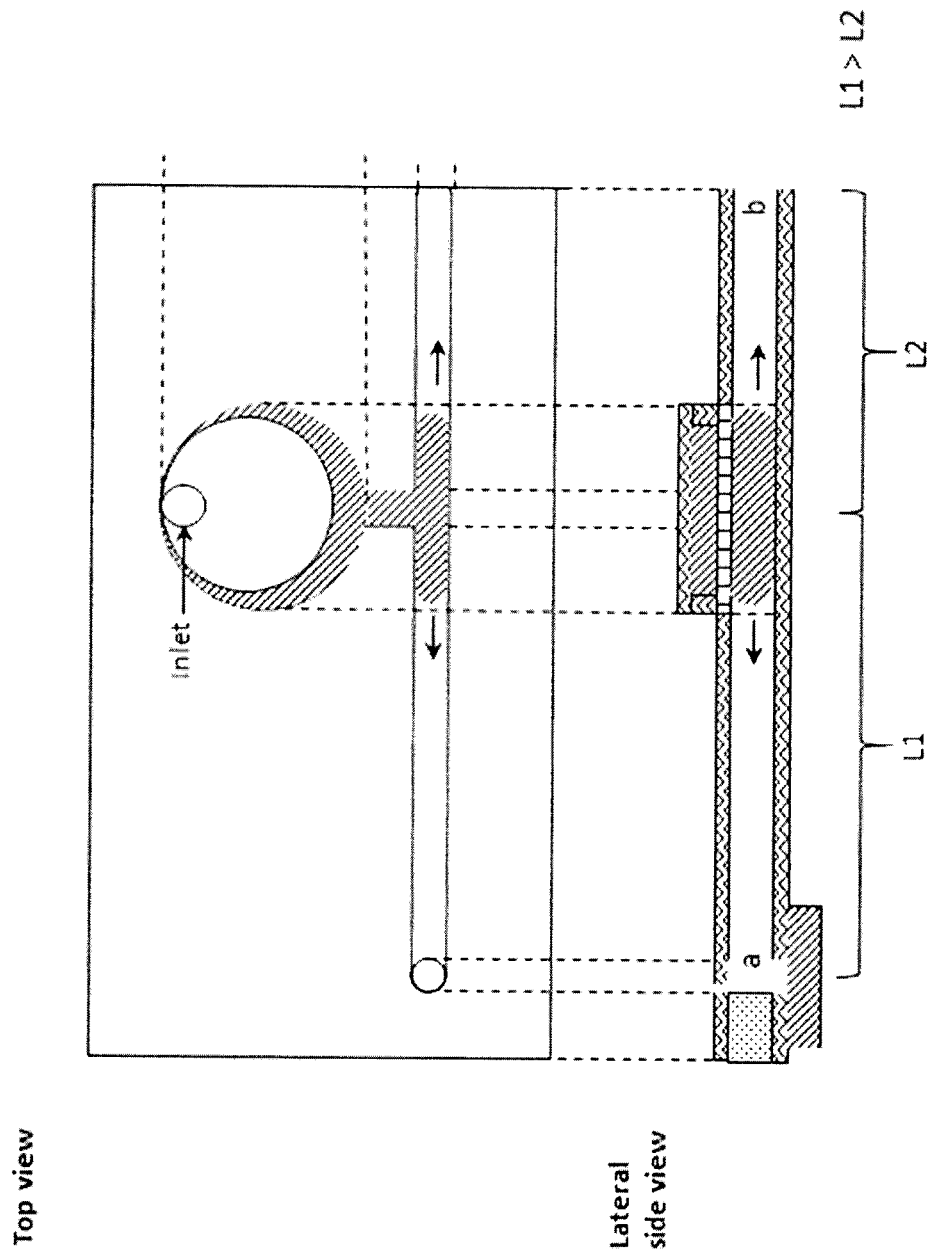
FIG. 7 shows how the metering channels starts to be filled a second time

FIG. 7 shows how the metered sample now is dispensed into the paper and plasma extraction continues and leads to refilling of the metering channel.

Figure 8:
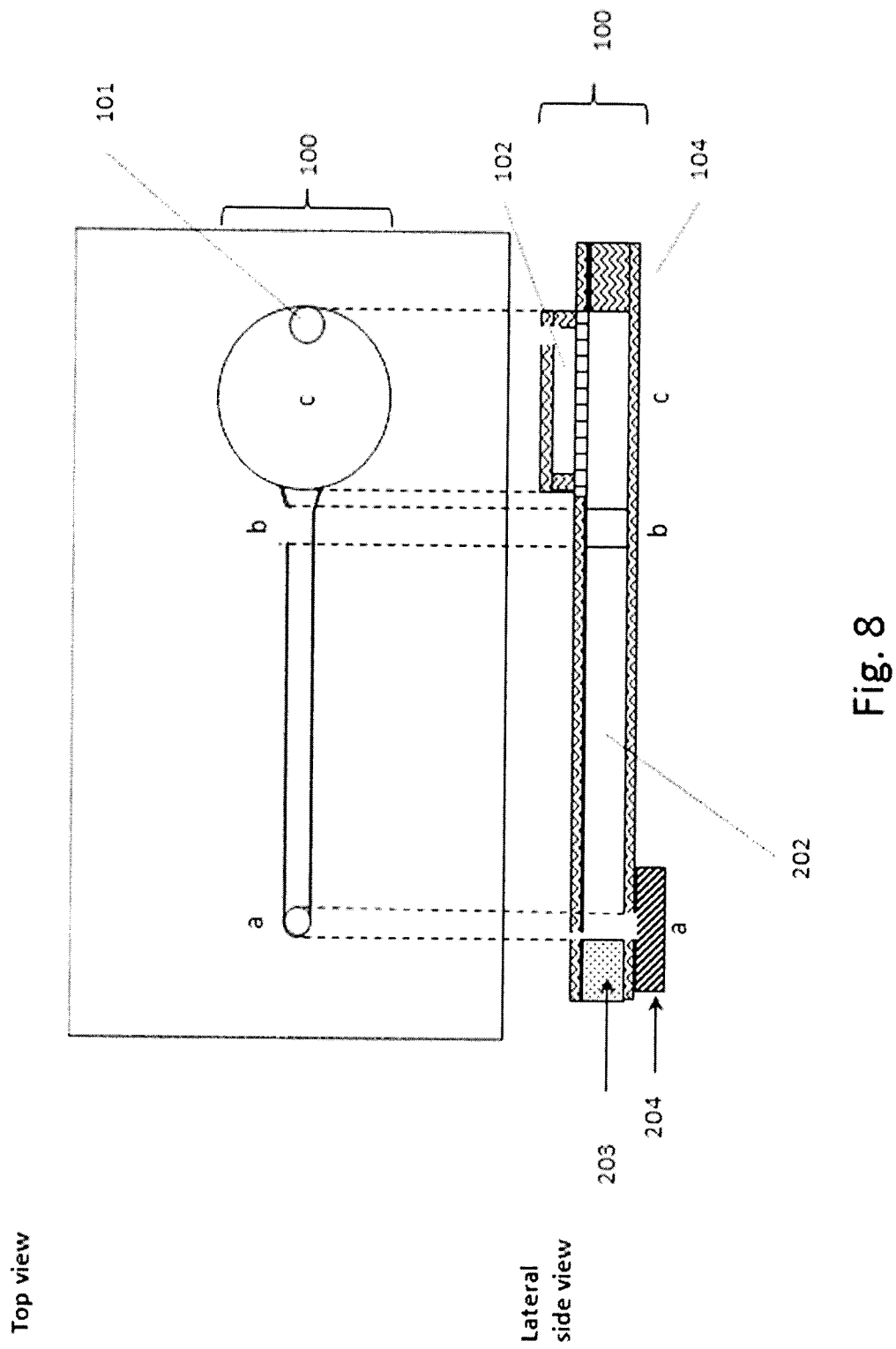
FIG. 8 shows another embodiment of a microfluidic device according to the invention.

FIG. 8 shows a top view and a lateral side view of another embodiment of the microfluidic device according to the invention with a linear metering channel, having the same plasma extraction compartment with a whole blood reservoir, a membrane and a plasma filtrate chamber as shown in FIGS. 1-7. The fluid connector is a connecting part extending between an outlet orifice of the plasma extraction compartment and an inlet of the metering channel, the fluid connector is provided with a vent in position b of FIG. 8.

In another alternative embodiment to the device depicted in FIG. 8, having the same features, but does not have any fluid connector, but an air pinch-off structure in the form of vent located between the metering channel (202) and the plasma filtrate chamber (104) serving as an interface between the first and the second regions with different flow resistance, This vent will admit a pinch-off effect when the metering channel (202) is filled and fluid has reached the paper matrix (204) due to a controlled inflow of air through the vent and the capillary force of the paper matrix. The air vent enables a controlled liquid pinch-off the providing the vent at the point of least capillary force. Plasma from the metering channel is thereby collected in the paper matrix for DBS and is admitted to be separated form excess plasma.

The particular design of the systems solve several challenging issues in extraction and metering of plasma in microfluidic systems by passive means:

The partitioning of the metered plasma from surplus plasma is achieved by shearing off the liquid at the metering- and connecting channel intersection. The shearing off appears due to a number of coexisting factors. The higher flow resistance in the connecting channel (which appears through the resistance of the membrane in the plasma extraction compartment) than in the metering channel, enables that upon contact with the paper, fluid is pulled from point b towards a in the metering channel rather from pulling fluid from point c, the plasma extraction compartment. The sharp corners of the inlet into the metering channel and the angle V of 90° or less between the connecting channel and metering channel cuts the liquid surface when the meniscus passes it, disabling the cohesion between the plasma in metering and connecting channel.

The exemplified system is tolerant to a variation in filling times of the metering channel which could be caused by variations in blood characteristics between individuals such as for example hematocrit. This is because the system has no event time dependent components, e.g. dissolvable valves for pinch/shear off The exemplified system is also tolerant to a variation in filling times of the metering channel which could be caused by mechanical variations and tolerances of the channels. This feature is achieved by the asymmetrical placement of the inlet from the connecting channel into the metering channel where L1>L2, so that there is a margin for the open channel path to complete filling first.

The exemplified placement of the intersection of the membrane extraction compartment and the metering channel towards the middle (but not at the middle) of the metering channel entails a stronger capillary force acting as capillary pump for the plasma extraction compartment rather than placing the plasma extraction compartment at the end of the metering channel (b). This is as two channels has stronger capillary force than one and promotes faster extraction rates.

After metering and absorption in the paper disc, the metering channel starts to re-fill. By limiting the input volume through a closed plasma extraction compartment, a second metering of surplus plasma is prevented. The closed plasma extraction compartment further prevents evaporation and contamination of the sample during the extraction process which can be as long as 30 min.

The invention is useful for example in biochemical analysis, therapeutic drug monitoring, screening of nutrients such as Vitamin D, Ferritin, and toxicological screening.

The invention claimed is:

1. A microfluidic device for transporting and sampling a defined volume of plasma, providing a fluid passageway from an inlet to an outlet, comprising:
   a first region comprising a plasma extraction compartment in fluid communication with the inlet, the plasma extraction compartment comprising a whole blood reservoir, a plasma separation membrane, and a plasma filtrate chamber for collecting the separated plasma, and being configured to receive and collect a whole blood sample and to separate plasma, said first region having an effective first flow resistance at any given time when transporting plasma;
   a second region comprising a metering channel of a defined volume extending between a first end and a second end, the second end being in fluid communication with the outlet, wherein the metering channel is in fluid communication with said plasma extraction compartment by means of a fluid connector between the first region and the second region, said second region having an effective second flow resistance at any given time when transporting plasma and being configured to meter a portion of the separated plasma, the portion having the defined volume; and
   a capillary means in fluid communication with the outlet and configured to exert sufficiently strong capillary force to transport and absorb the metered portion of the defined volume of separated plasma from the second region;
   wherein the effective first flow resistance in the first region is at least double the value of the effective second flow resistance in the second region at any given time when transporting plasma; and
   wherein the microfluidic device comprises an air vent located at the first end of the metering channel downstream of the plasma filtrate chamber, said air vent being unobstructed and open to the environment, and wherein the air vent is arranged, in combination with the effective first flow resistance and the effective second flow resistance, to separate the metered portion of plasma in the second region from additional plasma in the first region.

2. The microfluidic device according to claim 1, wherein the metering channel has a volume of between 0.5 µl and 50 µl.

3. The microfluidic device according to claim 1, wherein the fluid connector is a connecting channel with different dimensions in cross-sectional area and/or length than the metering channel.

4. The microfluidic device according to claim 3, wherein the connecting channel is linked to the metering channel with an abrupt change in dimension.

5. The microfluidic device according to claim 3, wherein the connecting channel meets the metering channel in a sharp corner and longitudinal symmetry axes of said connecting channel and said metering channel cross at an angle that is 90° or less.

6. The microfluidic device according to claim 3, wherein the metering channel has at least one branch with a dead end.

7. The microfluidic device according to claim 3, wherein the connecting channel meets the metering channel at a point that divides the metering channel in two asymmetric parts, a first part connected to the outlet with longer filling time than a second part.

8. The microfluidic device according to claim 7, wherein the first part is a longer part connected to the outlet and the second part is a shorter part connected to a dead end.

9. The microfluidic device according to claim 3, wherein the connecting channel has a lower cross-sectional area than the metering channel.

10. The microfluidic device according to claim 1, wherein the fluid connector is a connecting part between an outlet orifice of the plasma extraction compartment and an inlet of the metering channel.

11. The microfluidic device according to claim 10, wherein the fluid connector is provided with the air vent.

12. The microfluidic device according to claim 10, wherein the metering channel extends linearly from said inlet of the metering channel to the outlet.

13. The microfluidic device according to claim 1, wherein the capillary means is a porous matrix, optionally covered by a dissolvable film.

14. The microfluidic device according to claim 13, wherein the capillary means is paper, optionally covered by a dissolvable film of PVA.

15. The microfluidic device according to claim 1, wherein the whole blood reservoir is arranged to limit blood influx to the plasma separation membrane, and wherein said whole blood reservoir is configured so that the metering channel only can be filled once.

16. The microfluidic device according to claim 1, comprising a bridging element extending between the outlet and the capillary means.

* * * * *